US010688957B2

(12) United States Patent
Watanabe et al.

(10) Patent No.: US 10,688,957 B2
(45) Date of Patent: Jun. 23, 2020

(54) SEATBELT MOVING DEVICE

(71) Applicant: KABUSHIKI KAISHA TOKAI-RIKA-DENKI-SEISAKUSHO, Aichi-ken (JP)

(72) Inventors: Naoya Watanabe, Aichi-ken (JP); Takuhiro Saito, Aichi-ken (JP); Yasunori Hata, Aichi-ken (JP); Makoto Matsuzaki, Aichi-ken (JP); Yusuke Watada, Aichi-ken (JP); Tatsuhiro Murasaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 114 days.

(21) Appl. No.: 15/685,604

(22) Filed: Aug. 24, 2017

(65) Prior Publication Data
US 2018/0056933 A1    Mar. 1, 2018

(30) Foreign Application Priority Data

Aug. 29, 2016 (JP) ................. 2016-167091

(51) Int. Cl.
*B60R 22/20* (2006.01)
*B60R 22/28* (2006.01)
(Continued)

(52) U.S. Cl.
CPC ............ *B60R 22/205* (2013.01); *B60R 22/03* (2013.01); *B60R 22/206* (2013.01); *B60R 22/28* (2013.01); *B60R 2022/1818* (2013.01)

(58) Field of Classification Search
CPC ....... B60R 22/205; B60R 22/28; B60R 22/03; B60R 22/206; B60R 2022/1806; B60R 22/201; B60R 2022/208
See application file for complete search history.

(56) References Cited

U.S. PATENT DOCUMENTS 3,026,972 A * 3/1962 Hendry ................... B60R 22/28
                                                    188/374
3,842,564 A * 10/1974 Brown ................ E04F 11/1804
                                                    211/123
(Continued)

FOREIGN PATENT DOCUMENTS

JP    H07232578 A    9/1995
JP    2003-054360 A    2/2003
(Continued)

OTHER PUBLICATIONS

Office Action issued in the corresponding Japanese Application No. 2016-167091 dated Aug. 1, 2017.
(Continued)

*Primary Examiner* — Frank B Vanaman
(74) *Attorney, Agent, or Firm* — Roberts Calderon Safran & Cole P.C.

(57) ABSTRACT

In a lift-up buckle device, a slider and a shoe move forward and a buckle is moved to a stowed position. The shoe impacts against a protruding portion at a lower portion of a damper and interferes with a housing via the lower portion of the damper. Thus, the forward movement of the slider and shoe is stopped, while the damper absorbs an impact against the slider and shoe. Therefore, an amount of the impact against the slider and shoe that is absorbed by the damper may be increased by the protruding portion, and the damper may absorb the impact against the slider and shoe effectively.

4 Claims, 8 Drawing Sheets

(51) Int. Cl.
    *B60R 22/03*       (2006.01)
    *B60R 22/18*       (2006.01)

(56) References Cited

U.S. PATENT DOCUMENTS

| | | | | |
|---|---|---|---|---|
| 4,008,909 A * | 2/1977 | Otani | ............... | B60R 22/1955 |
| | | | | 297/470 |
| 4,573,322 A * | 3/1986 | Fohl | ............... | B60R 22/4619 |
| | | | | 280/805 |
| 4,618,129 A * | 10/1986 | Bechu | ............... | B60G 17/048 |
| | | | | 267/140.13 |
| 5,566,978 A * | 10/1996 | Fleming | ............... | B60R 22/1951 |
| | | | | 188/377 |
| 5,762,372 A * | 6/1998 | Koujiya | ............... | B60R 22/1953 |
| | | | | 280/801.1 |
| 2013/0187372 A1* | 7/2013 | Chang | ............... | B60R 22/20 |
| | | | | 280/801.1 |
| 2016/0304050 A1* | 10/2016 | Murasaki | ............... | A44B 11/2561 |

FOREIGN PATENT DOCUMENTS

| | | |
|---|---|---|
| JP | 2007-040468 A | 2/2007 |
| JP | 2009-150465 A | 7/2009 |
| JP | 2012-131360 A | 7/2012 |

OTHER PUBLICATIONS

Japanese Office Action in related Japanese Application No. 2017-180435 dated Jul. 3, 2018.

* cited by examiner

SEATBELT MOVING DEVICE

CROSS-REFERENCE TO RELATED APPLICATION

This application is based on and claims priority under 35 USC 119 from Japanese Patent Application No. 2016-167091 filed on Aug. 29, 2016, the disclosure of which is incorporated by reference herein.

BACKGROUND

Technical Field

The present invention relates to a moving device that moves a moving body.

Related Art

In a buckle moving device disclosed in Japanese Patent Application Laid-Open (JP-A) No. 2012-131360, an anchor slider is guided by a rail and moved. The anchor slider interferes with a screw bracket via a damper, the screw bracket stops the movement of the anchor slider, and the damper absorbs an impact against the anchor slider (the kinetic energy of the anchor slider).

In this buckle moving device, it is preferable if the damper is capable of absorbing energy effectively.

SUMMARY

In consideration of the circumstances described above, an object of the present invention is to provide a moving device in which an absorbing body may absorb energy effectively.

A moving device according to a first aspect of the present invention includes: a moving body that is provided at a seatbelt apparatus and is moved; a stopping body that stops movement of the moving body; and an absorbing body at which a protruding portion that protrudes is provided, the moving body interfering with the stopping body via the protruding portion, and the absorbing body absorbing an impact against the moving body.

In the moving device of the first aspect of the present invention, the moving body is provided at the seatbelt apparatus and the moving body is moved.

The protruding portion is provided protruding from the absorbing body. The moving body interferes with the stopping body via the protruding portion, the stopping body stops the movement of the moving body, and the absorbing body absorbs the impact against the moving body. Therefore, an absorption amount of the impact against the moving body that is absorbed by the absorbing body may be increased by the protruding portion. Thus, the absorbing body may absorb the impact against the moving body effectively.

In a moving device according to a second aspect of the present invention, in the moving device of the first aspect of the present invention, a cross-sectional area of the protruding portion orthogonal to a protrusion direction of the protruding portion decreases along the protrusion direction.

In the moving device of the second aspect of the present invention, the cross-sectional area orthogonal to the protrusion direction of the protruding portion decreases along the protrusion direction of the protruding portion. Therefore, absorption amounts of the impact against the moving body that are absorbed by the absorbing body may be progressively increased by the protruding portion.

In a moving device according to a third aspect of the present invention, the moving device of the first aspect or second aspect of the present invention further includes a contacting body that makes contact with the absorbing body but does not make contact with a region of the absorbing body at which the protruding portion is disposed.

In the moving device of the third aspect of the present invention, the contacting body makes contact with the absorbing body.

However, the contacting body does not make contact with the region of the absorbing body at which the protruding portion is disposed. Therefore, cases of the contacting body limiting the absorption of the impact against the moving body by the region of the absorbing body at which the protruding portion is disposed may be suppressed.

A moving device according to a fourth aspect of the present invention includes: a moving body that is provided at a seatbelt apparatus and is moved; a guiding body that guides movement of the moving body; and an absorbing body against which the moving body impacts, the absorbing body absorbing an impact against the moving body, and the absorbing body making contact with the guiding body and absorbing vibrations of the guiding body.

In the moving device of the fourth aspect of the present invention, the moving body is provided at the seatbelt apparatus, the moving body is moved, and the guiding body guides the movement of the moving body.

The moving body impacts against the absorbing body and the absorbing body absorbs the impact against the moving body. In addition, the absorbing body makes contact with the guiding body and the absorbing body absorbs vibrations in the guiding body. Therefore, the absorbing body may absorb the impact against the moving body and may absorb vibrations in the guiding body.

In a moving device according to a fifth aspect of the present invention, the moving device of the fourth aspect of the present invention further includes plural contacting walls provided at the guiding body, the absorbing body making contact with each of the contacting walls.

In the moving device of the fifth aspect of the present invention, the plural contact walls are provided at the guiding body, and the absorbing body makes contact with each of the plural contact walls. Therefore, the absorbing body may absorb vibrations in the guiding body effectively.

BRIEF DESCRIPTION OF THE DRAWINGS

Exemplary embodiments of the present invention will be described in detail based on the following figures, wherein.

DETAILED DESCRIPTION

Figure 1:
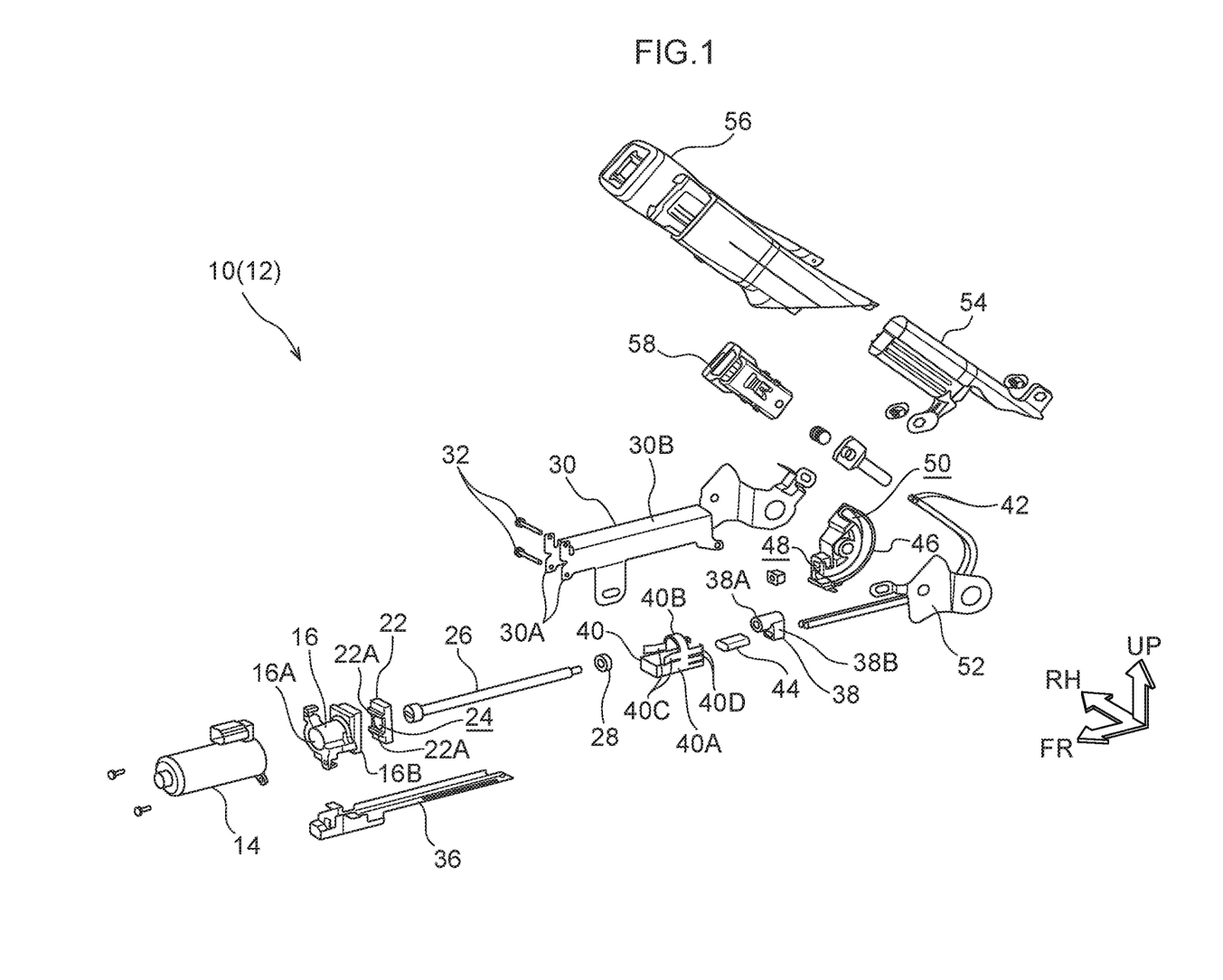
FIG. 1 is an exploded perspective view, seen diagonally from the front left, showing a lift-up buckle device according to an exemplary embodiment of the present invention.
Figure 2:
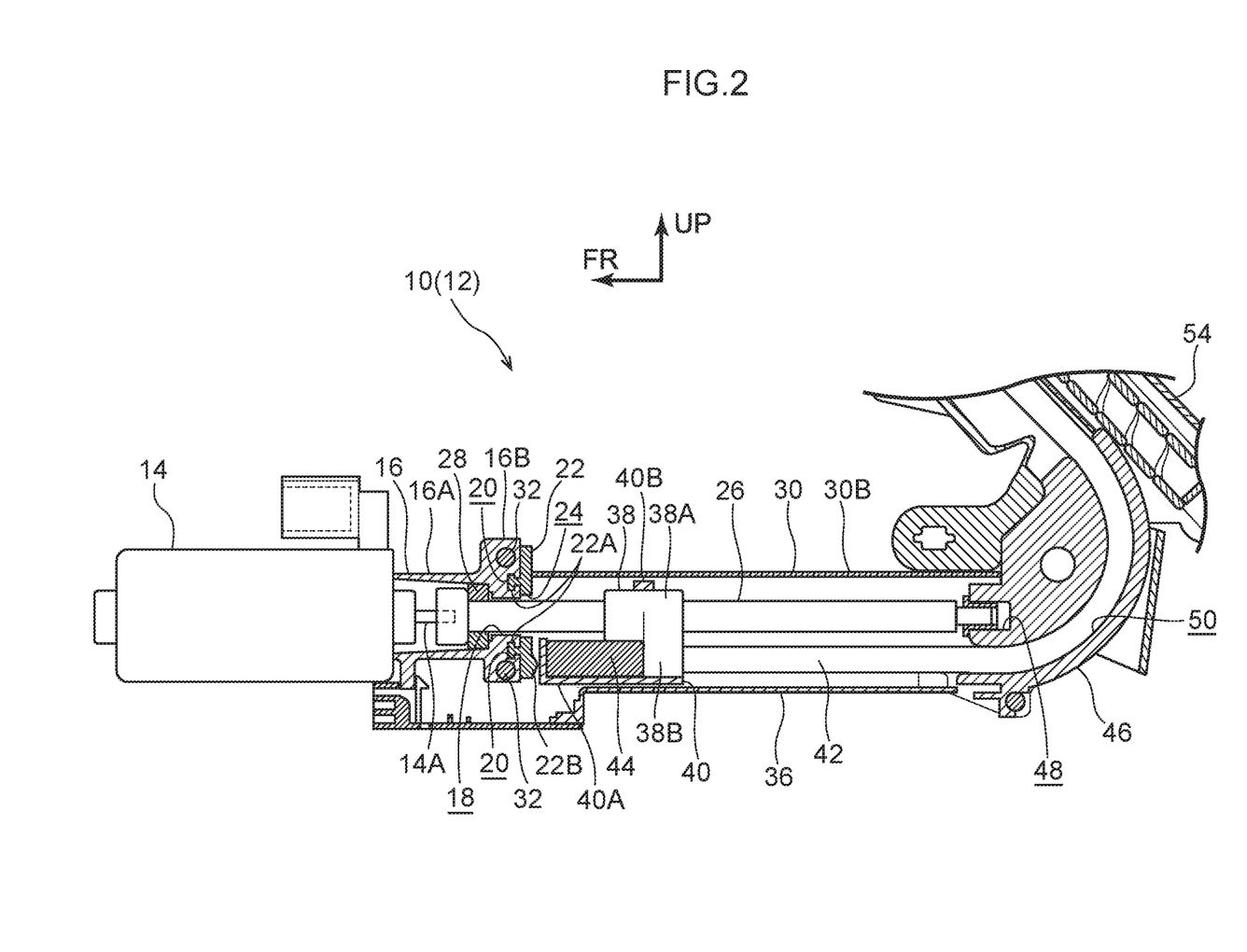
FIG. 2 is a sectional view, seen from the left, showing the lift-up buckle device according to the exemplary embodiment of the present invention.

FIG. 1 shows a lift-up buckle device 10 that serves as a moving device according to an exemplary embodiment of the present invention, in an exploded perspective view seen diagonally from the front left. FIG. 2 shows the lift-up buckle device 10 in a sectional view seen from the left. In the drawings, a front direction of the lift-up buckle device 10 is indicated by arrow FR, a right direction of the lift-up buckle device 10 is indicated by arrow RH, and an upper direction of the lift-up buckle device 10 is indicated by arrow UP.

The lift-up buckle device 10 according to the present exemplary embodiment structures a seatbelt apparatus 12 of a vehicle (an automobile). The seatbelt apparatus 12 is employed at a seat (not shown in the drawings) in a passenger compartment. A sitting sensor (not shown in the drawings) is provided at the seat and detects when a vehicle occupant is sitting on the seat. The sitting sensor is electronically connected to a control device (not shown in the drawings).

The seatbelt apparatus 12 is equipped with a take-up device (not shown in the drawings). The take-up device is fixed at the lower side at a vehicle width direction outer side of a seat rear portion. A webbing in a long, narrow belt shape (a seatbelt, not shown in the drawings) is taken up onto the take-up device from a proximal end thereof; the webbing can be pulled out from the take-up device. At the distal end side of the webbing relative to the take-up device, the webbing movably penetrates through a through-anchor (not shown in the drawings). The through-anchor is supported at the upper side at the vehicle width direction outer side of the seat rear portion. The distal end of the webbing is fixed to an anchor (not shown in the drawings), which is fixed at the lower side at the vehicle width direction outer side of the seat rear portion. Between the through-anchor and the anchor, the webbing movably penetrates through a tongue (not shown in the drawings).

The lift-up buckle device 10 is fixed at the lower side at the vehicle width direction inner side of the seat. Front, right and upper sides of the lift-up buckle device 10 are oriented to, respectively, the front, right and upper sides of the vehicle.

As shown in FIG. 1 and FIG. 2, a motor 14 is provided to serve as a driving unit at a front end portion of the lift-up buckle device 10. An output shaft 14A of the motor 14 projects to the rear. The motor 14 is electronically connected to the above-mentioned control device. Under the control of the control device, the motor 14 is driven forward and is driven in reverse and the output shaft 14A is turned in, respectively, one direction and another direction opposite to the one direction.

Figure 3:
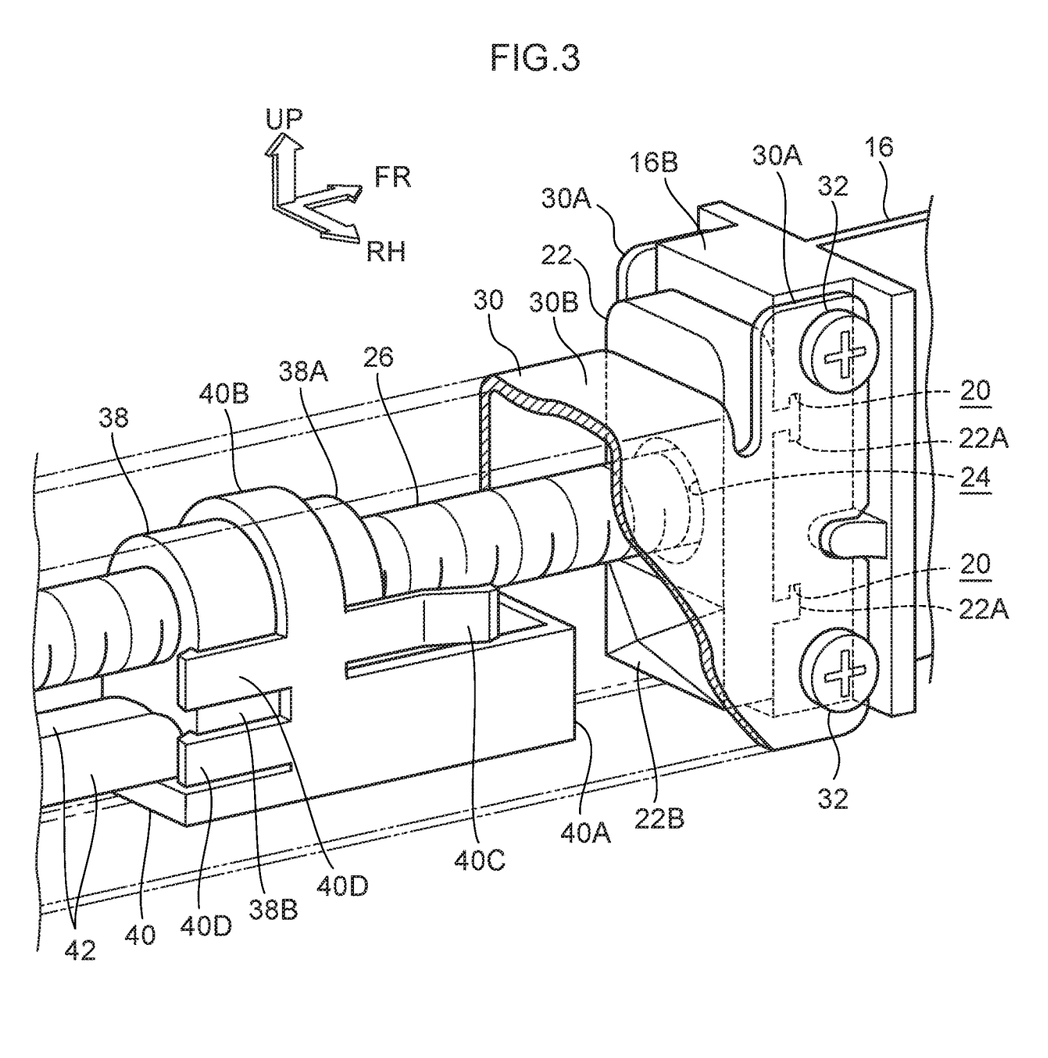
FIG. 3 is a perspective view, seen diagonally from the rear right, showing principal portions of the lift-up buckle device according to the exemplary embodiment of the present invention.
Figure 4:
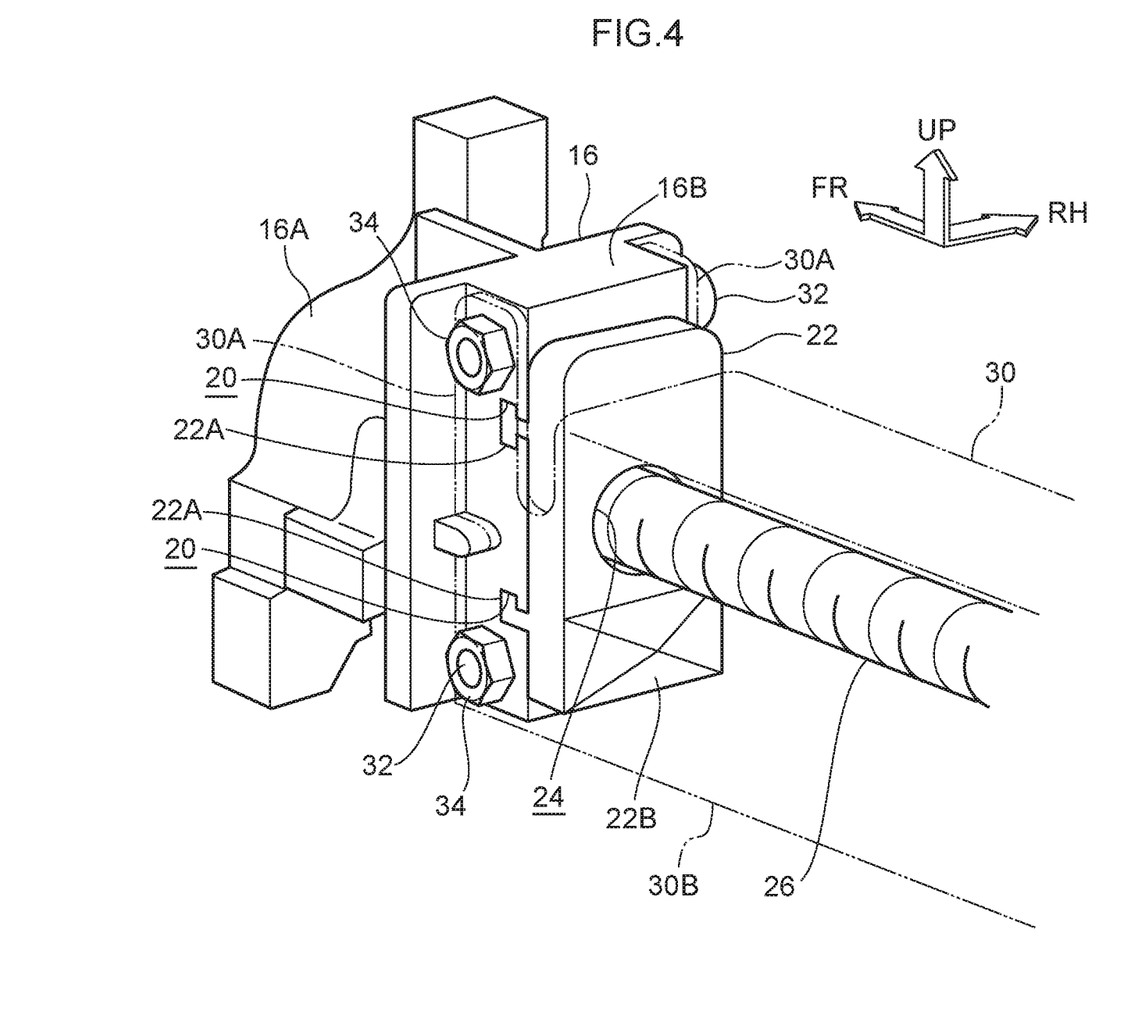
FIG. 4 is a perspective view, seen diagonally from the rear left, showing the principal portions of the lift-up buckle device according to the exemplary embodiment of the present invention.

A housing 16 fabricated of metal that serves as a stopping body is disposed at the rear side of the motor 14 (see FIG. 3 and FIG. 4). The motor 14 is assembled to the housing 16. A circular tube-shaped support cylinder 16A is provided at a front side region of the housing 16. The output shaft 14A of the motor 14 is coaxially inserted inside the support cylinder 16A.

Figure 6:
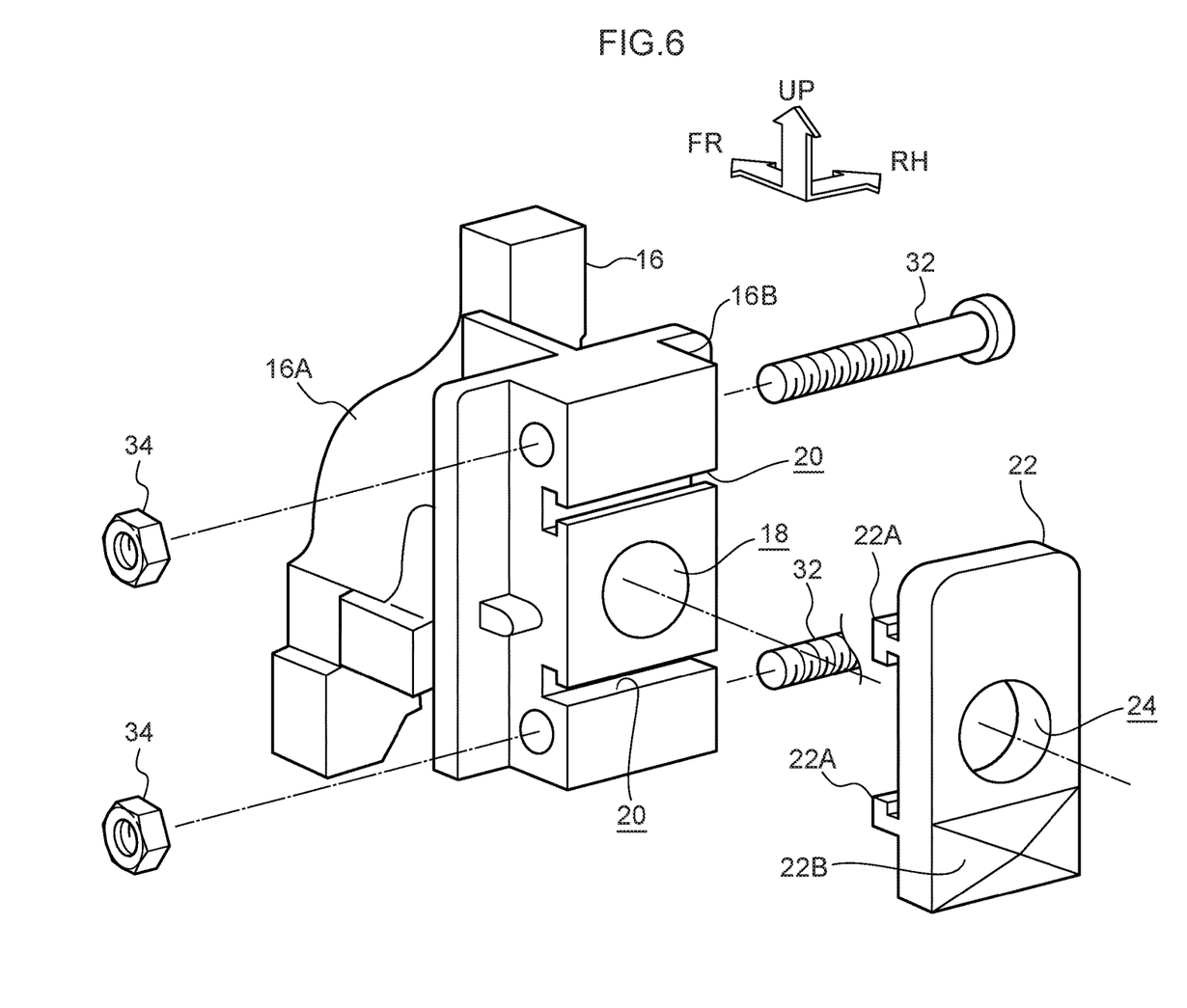
FIG. 6 is a perspective view, seen diagonally from the rear left, showing an assembling state of the damper to a housing of the lift-up buckle device according to the exemplary embodiment of the present invention.

A stopping block 16B in a substantially rectangular cuboid shape that serves as a stopping portion is provided at a rear end portion of the housing 16. A circular insertion hole 18 is formed penetrating through a central portion of the stopping block 16B. The insertion hole 18 coaxially communicates with the interior of the support cylinder 16A. A diametric dimension of the insertion hole 18 is smaller than a diametric dimension of the interior of the support cylinder 16A. Assembly holes 20 are formed in an upper portion and a lower portion of the stopping block 16B (see FIG. 6). Each assembly hole 20 extends in the left-and-right direction through the whole of the stopping block 16B in the left-and-right direction. A proximal end portion (rear side portion) of the assembly hole 20 is open to the rear side. A distal end portion (front side portion) of the assembly hole 20 protrudes one or both of upward and downward.

A damper 22 in a substantially rectangular cuboid shape that serves as an absorbing body is disposed at the rear side of the housing 16 (see FIG. 3 and FIG. 4). The damper 22 is fabricated of rubber and features resilience. Assembly projections 22A are provided integrally at an upper portion and a lower portion of a front face of the damper 22 (see FIG. 6). Each assembly projection 22A extends in the left-and-right direction over the whole of the damper 22 in the left-and-right direction. A proximal end portion (rear side portion) of the assembly projection 22A projects toward the front, and a distal end portion (front side portion) of the assembly projection 22A projects one or both of upward and downward. The assembly projections 22A are fitted into the assembly holes 20 of the stopping block 16B of the housing 16 from the left side or the right side. Hence, movements of the damper 22 in the vertical direction and the front-and-rear direction relative to the stopping block 16B are restricted (but slight movements of the damper 22 in the front-and-rear direction relative to the stopping block 16B are allowed). A circular penetrating hole 24 is formed penetrating through a central portion of the damper 22. The penetrating hole 24 coaxially communicates with the insertion hole 18 of the stopping block 16B. A square pyramidal protruding portion 22B is integrally provided at a lower portion of a rear face of the damper 22. The protruding portion 22B protrudes to the rear. A cross-sectional area of the protruding portion 22B orthogonal to the front-and-rear direction decreases toward the rear.

Figure 5A:
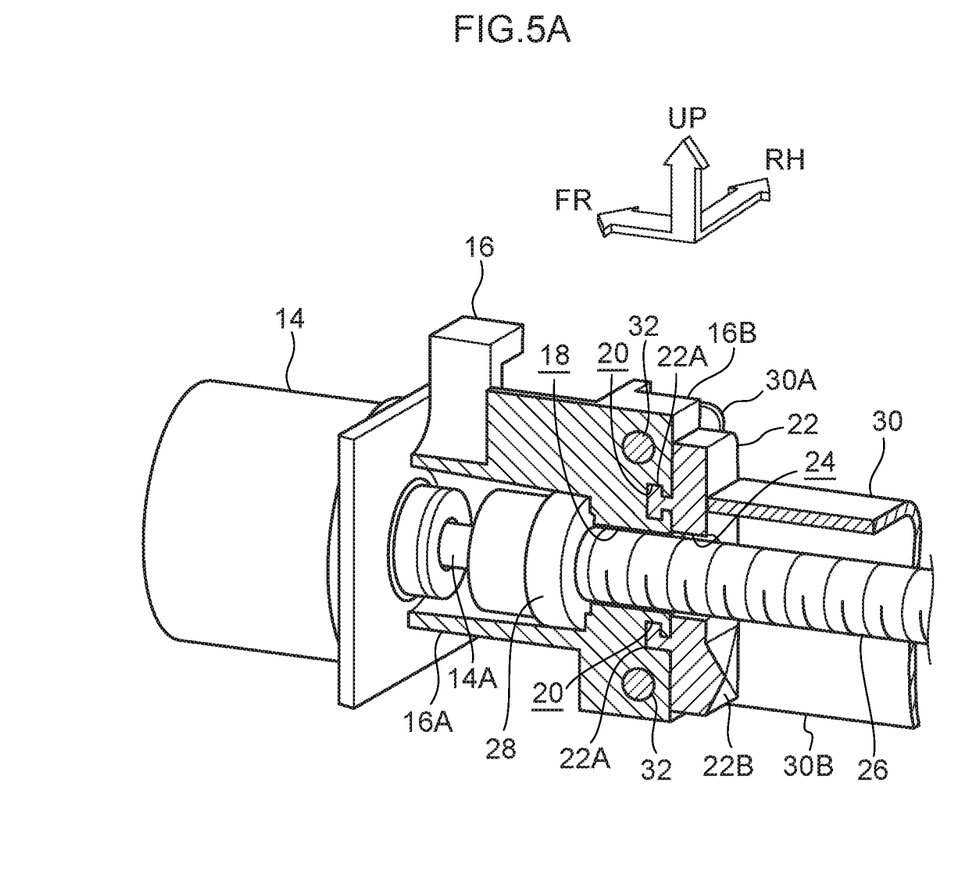
FIG. 5A is a perspective view, seen diagonally from the rear left, showing the interior of the principal portions of the lift-up buckle device according to the exemplary embodiment of the present invention.

A substantially circular rod-shaped drive screw 26 fabricated of metal that serves as a driving member is coaxially inserted into the support cylinder 16A of the housing 16, the insertion hole 18 and the penetrating hole 24 of the damper 22. The drive screw 26 projects rearward from the damper 22. A vicinity of the front end of the drive screw 26 is turnably fitted into a circular tube-shaped bearing 28. The bearing 28 is fixed inside the support cylinder 16A (see FIG. 5A). The output shaft 14A of the motor 14 is coupled to a proximal end of the drive screw 26, and the drive screw 26 turns integrally with the output shaft 14A. A male thread is formed at the outer periphery of the drive screw 26, except at a front end portion and a rear end portion thereof.

Figure 5B:
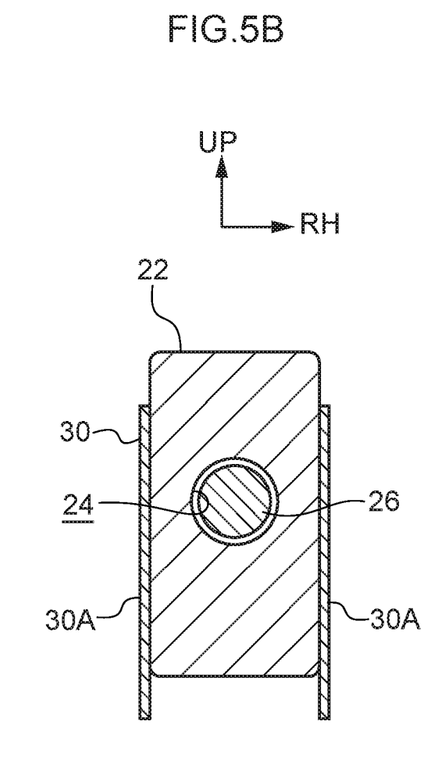
FIG. 5B is a sectional view, seen from the rear, showing a damper and a rail of the lift-up buckle device according to the exemplary embodiment of the present invention.

A rail 30 fabricated of metal is disposed at the rear side of the housing 16 (see FIG. 3 and FIG. 4). The rail 30 serves as a guiding body structuring a contacting body. A pair of assembly plates 30A in long, narrow, substantially rectangular plate shapes that serve as contacting walls are provided at a front end of the rail 30. The assembly plates 30A are disposed at the left side and right side of the stopping block 16B of the housing 16. Bolts 32 penetrate in the left-and-right direction through upper end portions and lower end portions of the stopping block 16B and the pair of assembly plates 30A. The bolts 32 are screwed into nuts 34. Thus, the stopping block 16B and the pair of assembly plates 30A are sandwiched between head portions of the bolts 32 and the nuts 34. Thus, the rail 30 is assembled to the stopping block 16B. The damper 22 is disposed between the pair of assembly plates 30A. Thus, the pair of assembly plates 30A restrict movements of the damper 22 in the left-and-right direction (see FIG. 5B). The pair of assembly plates 30A allow slight movements of the damper 22 in the left-and-right direction, and the pair of assembly plates 30A can come into contact with the damper 22.

A rail portion 30B in a long, narrow plate shape with a "U" shape in cross-section is provided at the rear side of the pair of assembly plates 30A. The rail portion 30B serves as a guiding portion. The interior of the rail portion 30B is open to the lower side. A left wall and a right wall of the rail portion 30B are integral with the respective assembly plates 30A. An upper wall of the rail portion 30B, which serves as a contacting wall, is disposed at the lower side relative to the upper ends of the assembly plates 30A. The drive screw 26 is accommodated inside the rail portion 30B, and the rail portion 30B is disposed to be parallel with the drive screw 26. The damper 22 is disposed between the upper wall of the rail portion 30B and the rear face of the stopping block 16B of the housing 16. The upper wall of the rail portion 30B and the rear wall face of the stopping block 16B allow slight movements of the damper 22 in the front-and-rear direction, and can come into contact with the damper 22.

A rail cover 36 that is fabricated of resin in a long, narrow, substantially rectangular plate shape is fixed to the lower side of the rail portion 30B. The rail cover 36 serves as an additional member structuring the contacting body. The rail cover 36 covers the interior of the rail portion 30B from the lower side thereof. The rail cover 36 also covers the lower side of the damper 22 and the rail cover 36 is spaced apart from the damper 22 to the lower side. Thus, the rail cover 36 cannot come into contact with the damper 22.

A slider 38 fabricated of metal is disposed inside the rail portion 30B (see FIG. 3). The slider 38 serves as a moving member that structures a moving body. An engaging portion 38A in a substantially circular tube shape is provided at an upper side portion of the slider 38. A female thread is formed at an inner periphery face of the engaging portion 38A. The drive screw 26 is coaxially inserted into the engaging portion 38A and the female thread is engaged by screwing with the male thread of the drive screw 26. A fixing portion 38B in a substantially rectangular cuboid shape is integrally provided at a rear side portion of the engaging portion 38A. The fixing portion 38B protrudes to the lower side from the engaging portion 38A.

A shoe 40 fabricated of resin is provided around the slider 38 (see FIG. 3). The shoe 40 serves as a surrounding member that structures the moving body. An accommodation case 40A in a substantially rectangular cuboid box shape is provided at a lower side portion of the shoe 40. The interior of the accommodation case 40A is open to the upper side and the rear side. A lower side portion of the engaging portion 38A and the fixing portion 38B of the slider 38 are accommodated in the accommodation case 40A. An accommodation frame 40B in a plate shape with an inverted "U" shape in cross section is integrally provided at the upper side of the accommodation case 40A. An upper side portion of the engaging portion 38A is accommodated and tightly fitted into the accommodation frame 40B.

Abutting pawls 40C are formed at front portions of a left wall and a right wall of the accommodation case 40A. The abutting pawls 40C protrude to the front side. Distal end portions (front end portions) of the abutting pawls 40C project to the outer sides of the shoe 40 in the left-and-right direction. The distal end portions of the abutting pawls 40C at the left side and the right side abut against, respectively, a left wall and a right wall of the rail portion 30B of the rail 30. As a result, movements of the shoe 40 in the left-and-right direction are restricted, and rotations of the shoe 40 and the slider 38 around the drive screw 26 relative to the rail portion 30B are restricted. Thus, when the drive screw 26 is rotated, the shoe 40 and the slider 38 integrally move in the front-and-rear direction while being guided by the rail portion 30B.

Two pairs of assembly pawls 40D are formed at a rear side portion of the accommodation case 40A. One of the pairs of assembly pawls 40D is disposed at the left wall of the accommodation case 40A, and the other of the pairs of assembly pawls 40D is disposed at the right wall of the accommodation case 40A. The pairs of assembly pawls 40D oppose one another in the left-and-right direction, and each of the two pairs of assembly pawls 40D is arrayed in the vertical direction. The assembly pawls 40D protrude to the rear side. Distal end portions (rear end portions) of the assembly pawls 40D project to the inner sides of the shoe 40 in the left-and-right direction. The distal end portions of the assembly pawls 40D are disposed at the rear side of the fixing portion 38B of the slider 38. When the slider 38 is moved rearward and the fixing portion 38B engages with the distal end portions of the assembly pawls 40D, the shoe 40 moves toward the rear side integrally with the slider 38 as mentioned above. When, for example, the distal end portions of the assembly pawls 40D are pushed to the rear side by the fixing portion 38B and the assembly pawls 40D are resiliently deformed to the outer sides of the shoe 40 in the left-and-right direction, the assembly pawls 40D at the left side and the right side abut against, respectively, the left wall and the right wall of the rail portion 30B of the rail 30. Therefore, the distal end portions of the assembly pawls 40D are kept disposed at the rear side of the fixing portion 38B (see FIG. 7C).

Proximal end portions (front side end portions) of a pair of wires 42 that serve as a linking member penetrate through the fixing portion 38B of the slider 38. The proximal end portions of the pair of wires 42 are fixed to the fixing portion 38B, by crimping the fixing portion 38B or the like, and may be moved integrally with the slider 38. A piece 44 is fixed to the pair of wires 42 at the front side of the fixing portion 38B. The piece 44 is accommodated in the accommodation case 40A of the shoe 40, and a front wall of the accommodation case 40A is disposed at the front side of the piece 44. The piece 44 moves forward integrally with the slider 38 and abuts against the front wall of the accommodation case 40A. Thus, the shoe 40 moves toward the front side integrally with the slider 38 as mentioned above.

A block-shaped wire guide 46 fabricated of metal that serves as a guiding member is fixed to the rear end of the rail portion 30B of the rail 30. The wire guide 46 is formed in a substantial hand fan shape in side view. A bearing hole 48 is formed at the front end of a lower portion of the wire guide 46. A rear end portion of the drive screw 26 is turnably supported by the bearing hole 48. A guide channel 50 is formed in the wire guide 46. The guide channel 50 is open to the left side. The guide channel 50 is curved in the side view and a lower end portion of the guide channel 50 opens to the front side and an upper end portion of the guide channel 50 opens in a direction that is oriented to the front side toward the upper side. The pair of wires 42 are inserted into the guide channel 50. Proximal end portions of the pair of wires 42 relative to the wire guide 46 extend in the front-and-rear direction, and distal end portions of the pair of wires 42 relative to the wire guide 46 extend in the direction that is oriented to the front side toward the upper side. A cover plate 52 in a plate shape that is fabricated of metal is fixed to the left side of the wire guide 46. The cover plate 52 closes off the left side of the guide channel 50.

As an example, a proximal end portion of a tubular lower cover 54 fabricated of rubber is attached to an upper portion of the wire guide 46. The lower cover 54 extends in the direction that is oriented to the front side toward the upper side. An upper end portion of the guide channel 50 of the wire guide 46 communicates with the interior of the lower cover 54, and the pair of wires 42 are inserted inside the lower cover 54.

A distal end (upper front side) of the lower cover 54 is inserted inside a tubular buckle cover 56 fabricated of, for example, resin. The buckle cover 56 is stiffer than the lower cover 54 and is slidable along the lower cover 54. The pair of wires 42 are inserted inside the buckle cover 56.

A buckle 58 that serves as a coupling body is fixed inside the buckle cover 56. Distal end portions (rear side end portions) of the pair of wires 42 are linked to the buckle 58. The buckle cover 56 exposes the buckle 58 at the distal end (upper front side) of the buckle cover 56. The aforementioned tongue is attachable to and detachable from the buckle 58. A buckle switch (not shown in the drawings) is provided at the buckle 58. The buckle switch detects when the tongue is attached, and is electronically connected to the aforementioned control device.

Now, operation of the present exemplary embodiment is described.

In the lift-up buckle device 10 with the structure described above, when no vehicle occupant is seated on the seat (when no vehicle occupant sitting on the seat is detected by the sitting sensor), the slider 38 and shoe 40 are disposed at a front region of the drive screw 26 and the rail 30, and the buckle cover 56 and buckle 58 are disposed at a stowed position at the lower rear side thereof.

When a vehicle occupant is seated on the seat (when the sitting sensor detects a vehicle occupant sitting on the seat), the motor 14 is driven forward under the control of the control device, rotating the output shaft 14A and the drive screw 26 in the one direction. As a result, the slider 38 and shoe 40 are moved toward the rear side, being guided by the rail portion 30B of the rail 30. In consequence, the pair of wires 42 move towards the distal end side thereof integrally with the slider 38, and the buckle cover 56 and buckle 58 are moved towards the upper front side and are disposed at a raised position. Meanwhile, the vehicle occupant pulls out the webbing from the take-up device and attaches the tongue of the webbing to the buckle 58. Because the tongue is being attached to the buckle 58 that is disposed at the raised position, the tongue may be attached to the buckle 58 with ease.

When the tongue has been attached to the buckle 58 (when the buckle switch detects that the tongue is attached to the buckle 58), the motor 14 is driven in reverse under the control of the control device, rotating the output shaft 14A and the drive screw 26 in the another direction that is opposite from the one direction. As a result, the slider 38 and shoe 40 are moved toward the front side, being guided by the rail portion 30B of the rail 30. In consequence, the pair of wires 42 move towards the proximal end side thereof integrally with the slider 38, and the buckle cover 56 and buckle 58 are moved towards the lower rear side and disposed at the stowed position. The webbing is applied to the vehicle occupant by the tongue being moved to the lower rear side together with the buckle 58.

When the slider 38 and shoe 40 (including the proximal end portions of the pair of wires 42 and the piece 44) are moving toward the front side as described above, the front face of the accommodation case 40A of the shoe 40 impacts against the protruding portion 22B at the lower portion of the damper 22. Thus, the front face of the accommodation case 40A interferes with the stopping block 16B of the housing 16 via the lower portion of the damper 22. Hence, the movement of the slider 38 and shoe 40 toward the front side is stopped and an impact of the damper 22 against the slider 38 and shoe 40 (i.e., kinetic energy of the slider 38 and shoe 40) is absorbed. Therefore, compared to a configuration in which the protruding portion 22B is not provided at the damper 22, an amount of deformation of the damper 22 by the slider 38 and shoe 40 may be increased by the protruding portion 22B. Thus, an absorption amount of the impact against the slider 38 and shoe 40 that is absorbed by the damper 22 may be increased by the protruding portion 22B, and the impact of the damper 22 against the slider 38 and shoe 40 may be absorbed effectively. As a result, sticking between the male thread of the drive screw 26 and the female thread of the slider 38 (the engaging portion 38A) when the movement of the slider 38 and shoe 40 toward the front side is stopped may be suppressed. Hence, when the slider 38 and shoe 40 are subsequently moved toward the rear side, the slider 38 and shoe 40 may be moved toward the rear side excellently.

The cross-sectional area of the protruding portion 22B orthogonal to the front-and-rear direction (the protrusion direction) decreases toward the rear (i.e., in the protrusion direction of the protruding portion 22B toward the shoe 40). Therefore, when the movement of the slider 38 and shoe 40 toward the front side is stopped, absorption amounts by the damper 22 of the impact against the slider 38 and shoe 40 may be progressively increased by the protruding portion 22B. Thus, the movement of the slider 38 and shoe 40 toward the front side may be stopped gently. Therefore, the buckle cover 56 and buckle 58 may be stopped at the stowed position gently, and the action of the buckle cover 56 and buckle 58 stopping at the stowed position may exhibit a sense of luxury.

The rail cover 36 at the lower side of the rail 30 is separated to the lower side from the lower portion of the damper 22 (i.e., the region at which the protruding portion 22B is disposed) and the lower portion of the damper 22 cannot come into contact with the rail cover 36. Therefore, when the lower portion of the damper 22 absorbs the impact against the slider 38 and shoe 40, a case of the rail cover 36 limiting deformation of the lower portion of the damper 22 may be suppressed. Thus, a case of the rail cover 36 limiting the absorption of the impact against the slider 38 and shoe 40 by the lower portion of the damper 22 may be suppressed.

The damper 22 can make contact with the upper wall of the rail portion 30B and the pair of assembly plates 30A of the rail 30. Therefore, when the motor 14 is being driven, even if vibrations of the motor 14 are transmitted through the housing 16 to the rail 30, the damper 22 absorbs vibrations (vibration energy) in the rail 30. Therefore, vibration noise from the rail 30 may be reduced and vibration noise from the lift-up buckle device 10 may be reduced. Moreover, because vibration noise from the rail 30 may be reduced by the damper 22 absorbing the impact against the slider 38 and shoe 40, there is no need to provide separate components for reducing vibration noise from the rail 30. Thus, a number of components may be reduced and costs may be lowered.

As described above, the damper 22 may come into contact with the upper wall of the rail portion 30B of the rail 30 and the assembly plates 30A that are integral with, respectively, the left wall and right wall of the rail portion 30B. Therefore, the damper 22 may absorb vibrations in the rail 30 effectively, and vibration noise from the rail 30 may be reduced effectively.

When the damper 22 is to be assembled, the assembly projections 22A of the damper 22 are inserted into the assembly holes 20 of the stopping block 16B of the housing 16 from the left side or the right side (a diametric direction outer side of the insertion hole 18 of the stopping block 16B). Thus, movements of the damper 22 in the vertical direction and the front-and-rear direction relative to the stopping block 16B are restricted. Then the rail 30 is assembled to the stopping block 16B, and movements of the damper 22 in the left-and-right direction are restricted by the pair of assembly plates 30A of the rail 30. Therefore, disengagement of the damper 22 from between the stopping block 16B and the rail 30 may be restricted, and the damper 22 may be assembled with ease. Furthermore, there is no need to provide separate components for assembly of the damper 22. Thus, the number of components may be reduced and costs may be lowered.

The damper 22 is not sandwiched between the pair of assembly plates 30A and is not sandwiched between the stopping block 16B and the upper wall of the rail 30. Therefore, actions of reaction forces from the rail 30 and the stopping block 16B on the damper 22 may be suppressed, and an accuracy with which the damper 22 absorbs the impact against the slider 38 and shoe 40 may be improved.

Figure 7A:
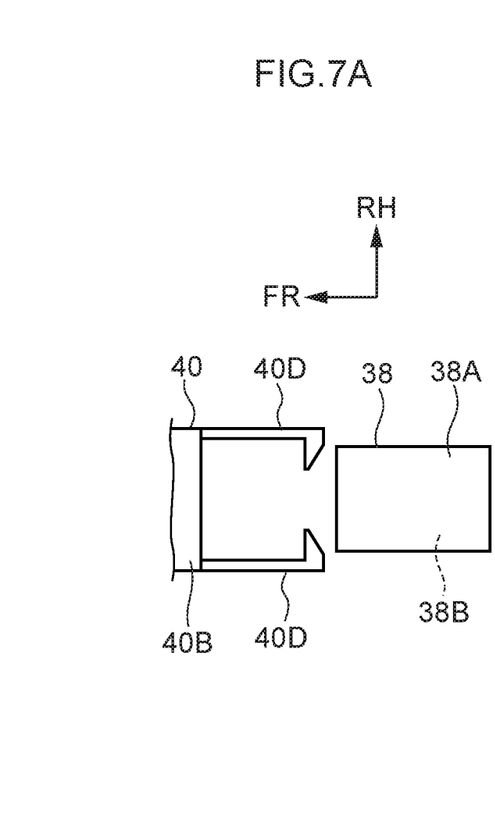
FIG. 7A is a plan view, seen from above, showing a slider and shoe of the lift-up buckle device according to the exemplary embodiment of the present invention prior to assembly.
Figure 7B:
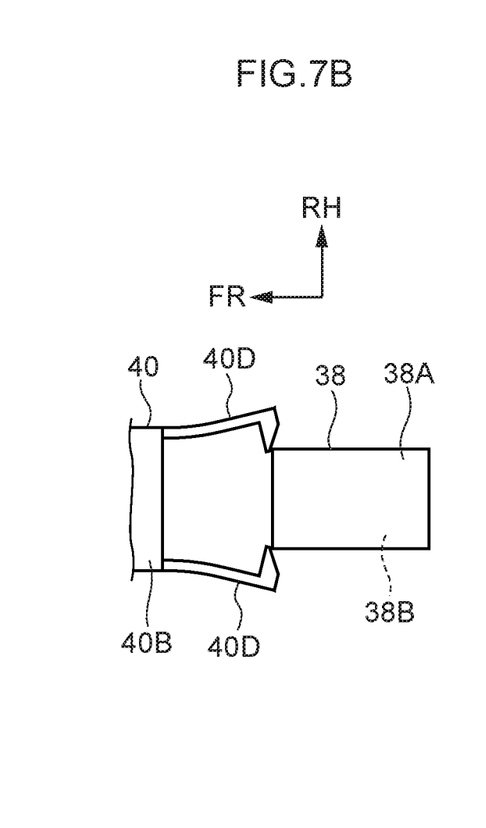
FIG. 7B is a plan view, seen from above, showing an assembling state of the slider and shoe of the lift-up buckle device according to the exemplary embodiment of the present invention.

As shown in FIG. 7A and FIG. 7B, when the slider 38 is to be assembled to the shoe 40, in a state in which the slider 38 and shoe 40 are not disposed inside the rail portion 30B of the rail 30, the assembly pawls 40D of the shoe 40 are resiliently reformed to the left-and-right direction outer sides of the shoe 40, and the slider 38 is inserted between the pair of assembly pawls 40D from the rear side. Hence, the assembly pawls 40D are resiliently restored towards the left-and-right direction inner sides of the shoe 40, and the distal end portions of the assembly pawls 40D are disposed at the rear side of the fixing portion 38B of the slider 38.

Figure 7C:
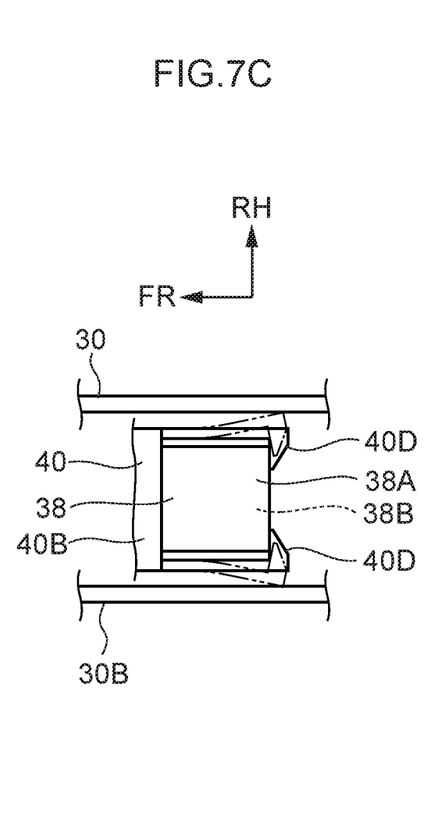
FIG. 7C is a plan view, seen from above, showing an assembled state of the slider and shoe of the lift-up buckle device according to the exemplary embodiment of the present invention.

As shown in FIG. 7C, in a state in which the slider 38 and shoe 40 are disposed inside the rail portion 30B, even if the assembly pawls 40D are resiliently deformed towards the left-and-right direction outer sides of the shoe 40, the assembly pawls 40D at the left side and the right side abut against, respectively, the left wall and the right wall of the rail portion 30B. Therefore, the distal end portions of the assembly pawls 40D are kept disposed to the rear side of the fixing portion 38B. Therefore, even if front-and-rear direction dimensions of the assembly pawls 40D (dimensions of projection to the rear side) are large, the distal end portions of the assembly pawls 40D may limit relative movement of the fixing portion 38B towards the rear side, and disengagement of the slider 38 to the rear side from the shoe 40 may be restricted. Moreover, because the front-and-rear direction dimensions of the assembly pawls 40D may be large, the assembly pawls 40D may easily be resiliently deformed to the left-and-right direction outer sides of the shoe 40 and the slider 38 may easily be inserted between the pair of assembly pawls 40D from the rear side. Thus, the slider 38 may be assembled to the shoe 40 with ease. In addition, a number of steps in assembly of the slider 38 to the shoe 40 may be reduced.

Figure 8A:
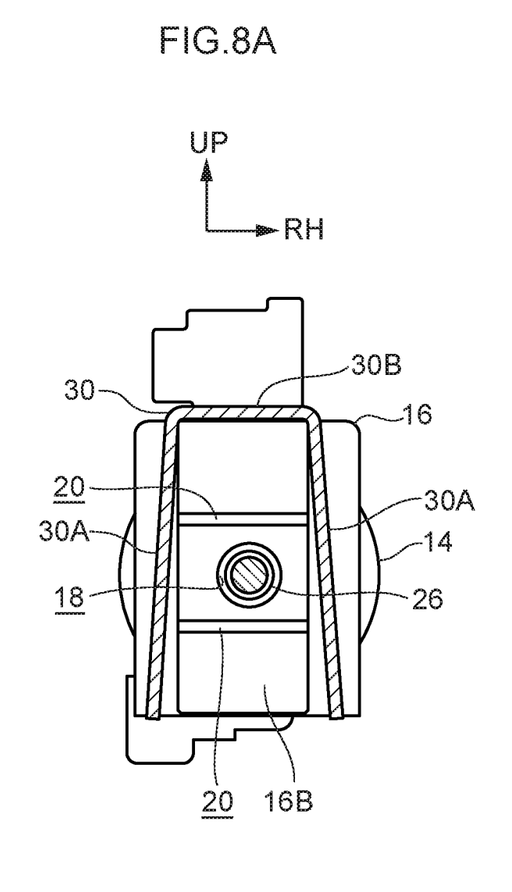
FIG. 8A is an elevation view, seen from the rear, showing an assembling state of a rail to a housing of a lift-up buckle device according to a variant example of the exemplary embodiment of the present invention.
Figure 8B:
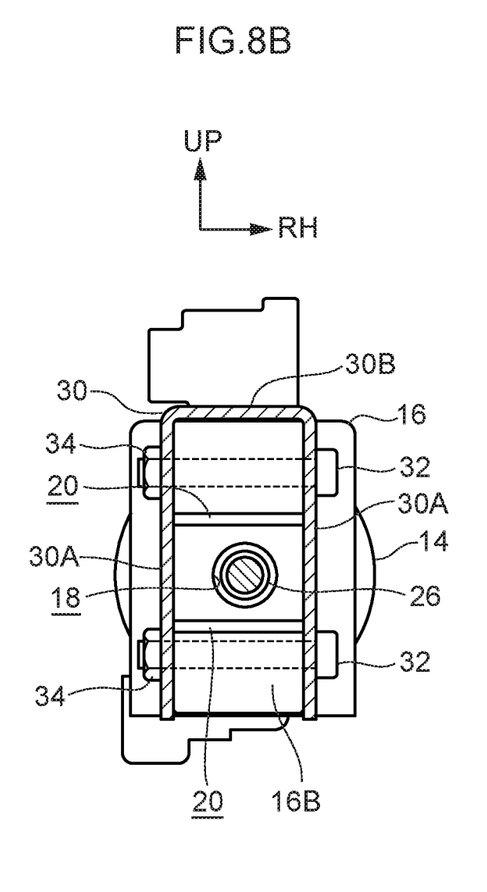
FIG. 8B is an elevation view, seen from the rear, showing an assembled state of the rail to the housing of the lift-up buckle device according to the variant example of the exemplary embodiment of the present invention.

In the present exemplary embodiment, the upper wall of the rail portion 30B of the rail 30 is disposed at the lower side of the upper ends of the pair of assembly plates 30A, at the rear side of the pair of assembly plates 30A. However, as illustrated in FIG. 8B, the upper wall of the rail portion 30B of the rail 30 may be disposed at the vertical direction position of the upper ends of the pair of assembly plates 30A, be extended forward, and be made integral with the upper ends of the pair of assembly plates 30A. In this case, as illustrated in FIG. 8A, before the rail 30 is assembled to the stopping block 16B of the housing 16, the rail 30 may be formed in a shape in which the pair of assembly plates 30A are angled in directions towards the left-and-right direction outer sides of the rail 30 towards the lower side. Accordingly, when the rail 30 is being assembled to the stopping block 16B, separation of the upper wall of the rail portion 30B to the upper side from the upper face of the stopping block 16B may be suppressed. Moreover, as shown in FIG. 8B, when the rail 30 has been assembled to the stopping block 16B, the stopping block 16B and the pair of assembly plates 30A are sandwiched between the head portions of the bolts 32 and the nuts 34, and the pair of assembly plates 30A may be angled towards the left-and-right direction inner sides of the rail 30 relative to the upper wall of the rail portion 30B. Thus, the pair of assembly plates 30A may be abutted against, respectively, the left face and the right face of the stopping block 16B. Therefore, the rail 30 may be assembled to the stopping block 16B with ease.

In the present exemplary embodiment, the damper 22 is capable of coming into contact with the upper wall of the rail portion 30B and the pair of assembly plates 30A of the rail 30. However, the damper 22 may be continuously in contact with one or more of the upper wall of the rail portion 30B and the pair of assembly plates 30A of the rail 30.

In the present exemplary embodiment, the lower portion of the damper 22 (the region at which the protruding portion 22B is disposed) may be made incapable of coming into contact with one or both of the pair of assembly plates 30A of the rail 30 by, for example, an incision being formed in one or both of a left end portion and a right end portion of the lower portion of the damper 22. Accordingly, when the lower portion of the damper 22 absorbs an impact against the slider 38 and shoe 40, a case of one or both of the pair of assembly plates 30A limiting deformation of the lower portion of the damper 22 may be suppressed. Thus, a case of one or both of the pair of assembly plates 30A limiting the absorption of the impact against the slider 38 and shoe 40 by the lower portion of the damper 22 may be suppressed.

In the present exemplary embodiment, the cross-sectional area of the protruding portion 22B orthogonal to the front-and-rear direction (the protrusion direction) decreases toward the rear (in the protrusion direction). However, the cross-sectional area of the protruding portion 22B orthogonal to the front-and-rear direction may be varied in the front-and-rear direction in various modes. Accordingly, speeds in the stopping of the movement of the slider 38 and shoe 40 toward the front may be regulated in various modes, and speeds in stopping of the buckle cover 56 and buckle 58 at the stowed position may be regulated in various modes.

In the present exemplary embodiment, the damper 22 (including the protruding portion 22B) is provided at the housing 16. However, the damper 22 (including the protruding portion 22B) may be provided at the shoe 40.

In the present exemplary embodiment, the buckle 58 is moved by the slider 38 and shoe 40 (the moving body) being moved, but the take-up device, the webbing, the through-anchor, the anchor or the tongue may be moved by a moving body being moved.

What is claimed is:

1. A seatbelt moving device comprising:
   a moving body that structures a seatbelt apparatus and is moved such that a seatbelt is moved;
   a stopping body that stops movement of the moving body; and
   an absorbing body at which a protruding portion that protrudes from a part of a face of the absorbing body facing the moving body is provided, the moving body interfering with the stopping body via the protruding portion, and the absorbing body absorbing an impact against the moving body,
   wherein a cross-sectional area of a distal side portion of the protruding portion that is orthogonal to a protrusion direction of the protruding portion is smaller than a cross-sectional area of a base side portion of the protruding portion orthogonal to the protrusion direction,
   further comprising a contacting body that makes contact with the absorbing body, wherein the absorbing body is fitted to the stopping body and the contacting body is assembled to the stopping body such that the absorbing body is assembled to the stopping body by the contacting body restricting movement of the absorbing body.

2. The seatbelt moving device according to claim 1, wherein a cross-sectional area of the protruding portion orthogonal to a protrusion direction of the protruding portion decreases along the protrusion direction.

3. The seatbelt moving device according to claim 1, wherein the protruding portion is a continuous solid body along the cross-sectional area of a distal side portion.

4. A seatbelt moving device comprising:
   a moving body that structures a seatbelt apparatus and is moved such that a seatbelt is moved;
   a stopping body that stops movement of the moving body; and
   an absorbing body at which a protruding portion that protrudes from a part of a face of the absorbing body facing the moving body is provided, the moving body interfering with the stopping body via the protruding portion, and the absorbing body absorbing an impact against the moving body,
   wherein a cross-sectional area of a distal side portion of the protruding portion that is orthogonal to a protrusion direction of the protruding portion is smaller than a cross-sectional area of a base side portion of the protruding portion orthogonal to the protrusion direction, further comprising a drive screw that drives the moving body.

* * * * *